United States Patent
Hattori et al.

(10) Patent No.: US 7,066,599 B2
(45) Date of Patent: Jun. 27, 2006

(54) DISPLAY UNIT

(75) Inventors: Tomohiko Hattori, Ogaki (JP); Isao Yokota, Kariya (JP); Kazuto Noritake, Kariya (JP); Masanori Tsuzaka, Kariya (JP); Katsuya Tanase, Kariya (JP)

(73) Assignees: Kabushiki Kaisha Toyota Jidoshokki, Kariya (JP); Sea Phone Co., Ltd., Gifu (JP)

( * ) Notice: Subject to any disclaimer, the term of this patent is extended or adjusted under 35 U.S.C. 154(b) by 189 days.

(21) Appl. No.: 10/869,218

(22) Filed: Jun. 16, 2004

(65) Prior Publication Data

US 2004/0257531 A1  Dec. 23, 2004

(30) Foreign Application Priority Data

Jun. 17, 2003 (JP) .............................. 2003-172428

(51) Int. Cl.
| | |
|---|---|
| G03B 21/00 | (2006.01) |
| G02B 27/22 | (2006.01) |
| G02B 26/26 | (2006.01) |
| G02B 6/42 | (2006.01) |

(52) U.S. Cl. ............................ 353/7; 353/10; 359/462; 385/16

(58) Field of Classification Search .................... 353/7, 353/10, 30, 31, 102; 349/5, 7; 359/462; 385/16

See application file for complete search history.

(56) References Cited

U.S. PATENT DOCUMENTS

2004/0240777 A1* 12/2004 Woodgate et al. ............ 385/16
2004/0257531 A1* 12/2004 Hattori et al. ................ 353/10
2004/0263968 A1* 12/2004 Kobayashi et al. ......... 359/462

FOREIGN PATENT DOCUMENTS

| JP | 9-171156 | 6/1997 |
|---|---|---|
| JP | 9-281440 | 10/1997 |
| JP | 9-297284 | 11/1997 |
| JP | 11-308642 | 11/1999 |
| JP | 2002-98957 | 4/2002 |

* cited by examiner

*Primary Examiner*—Melissa Jan Koval
(74) *Attorney, Agent, or Firm*—Morgan & Finnegan, LLP

(57) ABSTRACT

A display unit for displaying first and second images includes a display device, a parallax barrier arranged facing the display device, and a lenticular lens arranged facing the parallax barrier. The parallax barrier includes a plurality of slit regions. A slit control section alternately switches each slit region between a transmitting state and a shielding state at a predetermined cycle. An image signal output section provides, in synchronization with the switching of the slit region, image data to the display device so that the plurality of pixels of the display device display an image different from the image displayed before switching of the slit region.

36 Claims, 17 Drawing Sheets

DISPLAY UNIT

BACKGROUND OF THE INVENTION

The present invention relates to a display unit for displaying a plurality of two-dimensional images, for example, images with parallax, each at a different position without lowering a horizontal resolution and with high intensity.

A known method of displaying a stereoscopic image without using special glasses includes a lenticular lens method, a parallax barrier method and the like. Japanese Laid-Open Patent Publication No. 9-171156 discloses a stereoscopic image display device that switches barriers and slots of the parallax barrier in synchronization with the timing of switching the display image.

However, in this stereoscopic display device, light passing through the parallax barrier reaches an observation point in a spread state. Thus, an image observed at the observation point appears dark.

SUMMARY OF THE INVENTION

The present invention aims to provide a display unit for displaying a plurality of images each at a different position without lowering the horizontal resolution and with high intensity.

One aspect of the present invention is a display unit for displaying a plurality of images including a first image and a second image, the display unit including a light-emitting display device including a light-emission surface and a plurality of pixels for displaying an image, an image signal output section for controlling the display device, the image signal output section providing image data to the display device so that at least one first pixel of the plurality of pixels displays the first image and at least one second pixel of pixels adjacent to the at least one first pixel displays the second image, a parallax barrier arranged facing the light-emission surface of the display device, the parallax barrier including a plurality of slit regions, each slit region being switched between a transmitting state allowing transmitting of light and a shielding state prohibiting transmitting of light, and a lenticular lens arranged facing the plurality of slit regions of the parallax barrier. A slit control section alternately switches each slit region between the transmitting state and the shielding state at a predetermined cycle. The image signal output section provides, in synchronization with the switching of the plurality of slit regions between the transmitting state and the shielding state, the image data to the display device so that each of the at least one first pixel and the at least one second pixel displays an image different from the image displayed before switching the slit region between the transmitting state and the shielding state.

A further aspect of the present invention is a display unit including a light-emitting display device including a light-emission surface and a plurality of pixels forming a plurality of display positions arranged in the horizontal direction, a parallax barrier arranged facing the light-emission surface of the display device, the parallax barrier including a plurality of slit regions arranged in the horizontal direction, each slit region being switched between a transmitting state allowing transmitting of light and a shielding state prohibiting transmitting of light, and a lenticular lens arranged facing the parallax barrier. An image signal output section connected to the display device equally divides each of N images of a first image to an Nth image having a plurality of continuous parallax to a plurality of divided images and displays each of the plurality of divided images of the N images at the plurality of display positions of the display device. The image signal output section provides the display device with image data generated so that each of the divided images of the N images is repeatedly displayed in a predetermined order at the relative display position. A slit control section alternately switches each of the plurality of slit regions between the transmitting state and the shielding state at a predetermined cycle. The image signal output section provides, in synchronization with the switching of the plurality of slit regions between the transmitting state and the shielding state, the image data to the display device so that each pixel displays an image different from the image displayed before switching the slit region between the transmitting state and the shielding state.

A further aspect of the present invention is a display unit including a light-emitting display device for displaying an image, the display device including a light-emission surface and a plurality of pixels forming a plurality of display positions arranged in the horizontal direction, a parallax barrier arranged facing the light-emission surface of the display device, the parallax barrier including a plurality of slit regions arranged in the horizontal direction, each slit region being switched between a transmitting state allowing transmitting of light and a shielding state prohibiting transmitting of light, and a lenticular lens arranged facing the parallax barrier. An image signal output section equally divides each of a right eye image and a left eye image to a plurality of divided images each displayed on the plurality of display positions of the display device, provides the display device with image data generated so that a mixed image in which the divided images of the right eye image and the divided images of the left eye image are alternately arranged side-by-side in the horizontal direction is displayed on the plurality of display positions. A slit control section alternately switches each of the plurality of slit regions between the transmitting state and the shielding state at a predetermined cycle so that light of the divided images of the right eye image and light of the divided images of the left eye image alternately transmit through the parallax barrier. The image signal output section provides, in synchronization with the switching of the plurality of slit regions between the transmitting state and the shielding state, the image data to the display device so that the divided images related to the left eye image and the divided images related to the right eye image are alternately displayed on each display positions.

A further aspect of the present invention is a display unit including a light-emitting display device including a light-emission surface and a plurality of pixels displaying images, a parallax barrier arranged facing the light-emission surface of the display device, the parallax barrier including a plurality of slit regions, each being switched between a transmitting state allowing transmitting of light and a shielding state prohibiting transmitting of light, a lenticular lens arranged facing the plurality of slit regions of the parallax barrier. An image signal output section provides image data to the display device so that at least one first pixel of the plurality of pixels displays a first image and at least one second pixel of pixels adjacent to the at least one first pixel displays a second image. A slit control section switches each of the plurality of slit regions between the transmitting state and the shielding state.

A further aspect of the present invention is a display unit including a back light device, a transmissive image display panel including a plurality of pixels for passing light from the back light device and displaying an image, an image signal output section for controlling the transmissive image display panel, the image signal output section providing image data to the transmissive image display panel so that at least one first pixel of the plurality of pixels displays a first image and at least one second pixel of pixels adjacent to the at least one first pixel displays a second image, a parallax barrier arranged facing the transmissive image display panel, the parallax barrier including a plurality of slit regions, each slit region being switched between a transmitting state allowing transmitting of light and a shielding state prohibiting transmitting of light, a slit control section for switching each of the plurality of slit regions between the transmitting state and the shielding state, and a lenticular lens, arranged facing the parallax barrier, including same number of lens portions as the plurality of slit regions.

A further aspect of the present invention is a display unit including a self-emitting display including a plurality of pixels for displaying an image. An image signal output section provides image data to the self-emitting display so that at least one first pixel of the plurality of pixels displays a first image and at least one second pixel of pixels adjacent to the at least one first pixel displays a second image. A parallax barrier arranged facing the self-emitting display, includes a plurality of slit regions, each slit region being switched between a transmitting state allowing transmitting of light and a shielding state prohibiting transmitting of light. A slit control section selectively switches each of the plurality of slit regions between the transmitting state and the shielding state. A lenticular lens arranged facing the parallax barrier includes same number of lens portions as the plurality of slit regions.

A further aspect of the present invention is a display unit including a light-emitting display device for displaying an image, the display device including a light-emission surface and a plurality of pixels forming a plurality of display positions aligned in a horizontal direction. An image signal output section equally divides a right eye image and a left eye image to a plurality of divided images each displayed on the plurality of display positions of the display device, generates image data so as to display a mixed image in which the divided images of the right eye image and the divided images of the left eye image are alternately arranged side-by-side in the horizontal direction, and provides the image data to the display device. A parallax barrier arranged facing the light-emission surface of the display device includes a plurality of slit regions arranged in the horizontal direction, each slit region being selectively switched between a transmitting state allowing transmitting of light and a shielding state prohibiting transmitting of light. A lenticular lens is arranged facing the parallax barrier. A slit control section alternately switches each of the plurality of slit regions between the transmitting state and the shielding state at a predetermined cycle so that light of the divided images of the right eye image and light of the divided images of the left eye image in the mixed image alternately pass through the parallax barrier. The image signal output section provides, in synchronization with the switching of the slit region between the transmitting state and the shielding state, image data to the display device so that the divided images related to the left eye image and the divided images related to the right eye image are alternately displayed at each display position.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
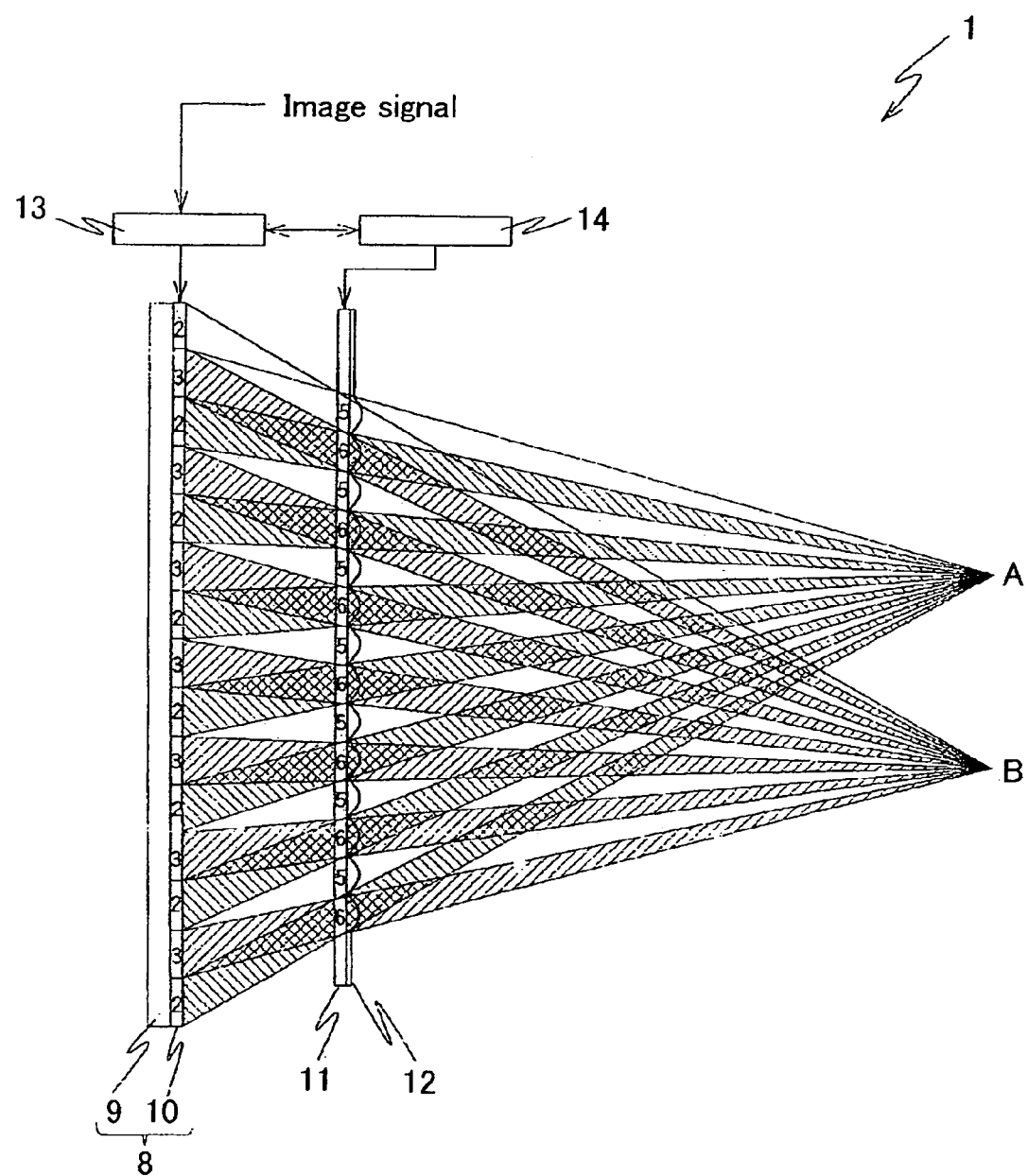
FIGS. 1 and 2 are diagrams showing light path switching by a display unit according to a first embodiment of the present invention.

A display unit 1 for displaying two different images according to a first preferred embodiment of the present invention will now be described with reference to FIGS. 1 to 4.

The display unit 1 includes a liquid crystal display device 8 serving as a light-emitting display device, an image signal output section 13, a parallax barrier 11, a slit control section 14, and a lenticular lens 12.

The liquid crystal display device 8 includes a liquid crystal panel 10 serving as a transmissive image display panel, and an organic electroluminescence device 9 serving as a back light device. A known thin film transistor LCD may be used as the liquid crystal panel 10.

Figure 4A:
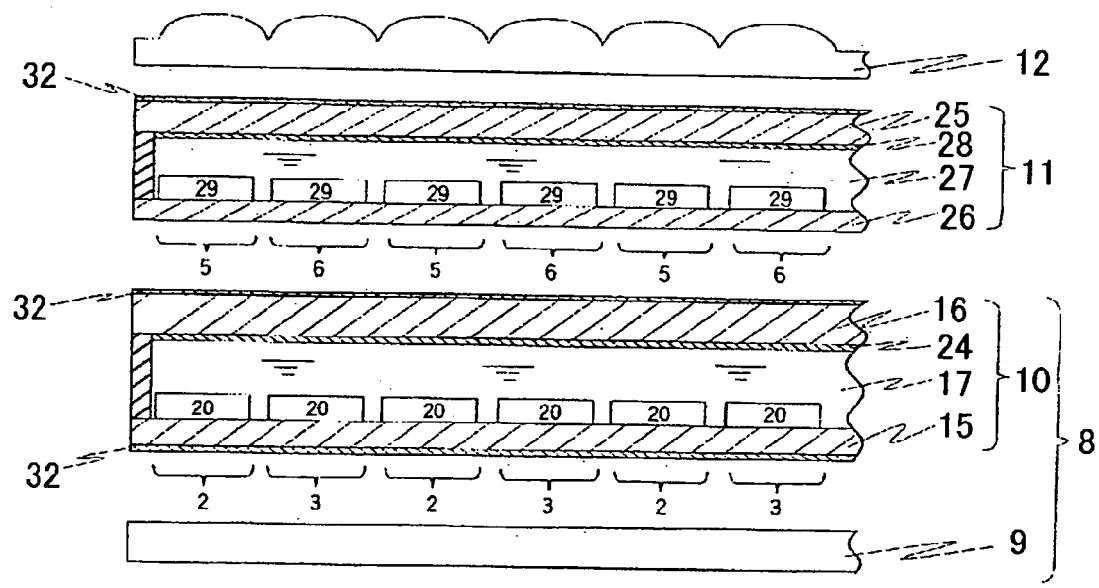
FIG. 4A is a partial sectional view of the display unit of the first embodiment.

As shown in FIG. 4A, the liquid crystal panel 10 includes a first transparent substrate 15 and a second transparent substrate 16 arranged facing each other or parallel to each other, and a liquid crystal layer 17 held between the first transparent substrate 15 and the second transparent substrate 16.

A polarizing plate 32 is arranged on exterior surfaces of the substrates, or an upper surface of the second transparent substrate 16 and a lower surface of the first transparent substrate 15.

Pixels 2 and 3 are arranged at a predetermined pitch on a surface contacting the liquid crystal layer 17 of the first transparent substrate 15. Each pixel 2 and 3 includes a scanning line 18, a signal line 19, a pixel electrode 20, a TFT 21 or a driving portion, an auxiliary capacitor 22 and an auxiliary capacitor line 23, as shown in the equivalent circuit diagram of FIG. 4B.

The TFT 21 functioning as a switch element is arranged in the vicinity of an intersection of the scanning line 18 and the signal line 19. A gate electrode of the TFT 21 is connected to the scanning line 18, a source electrode (or a drain electrode) thereof is connected to the signal line 19, and the drain electrode (or the source electrode) thereof is connected to the pixel electrode 20.

The auxiliary capacitor 22 for holding a charge is connected to the pixel electrode 20 in series therewith. The auxiliary capacitor 22 produces a capacity Cs between the pixel electrode 20 and the auxiliary capacitor line 23. A constant electric potential is applied to the auxiliary capacitor 22 from an external control circuit (not shown).

Figure 4B:
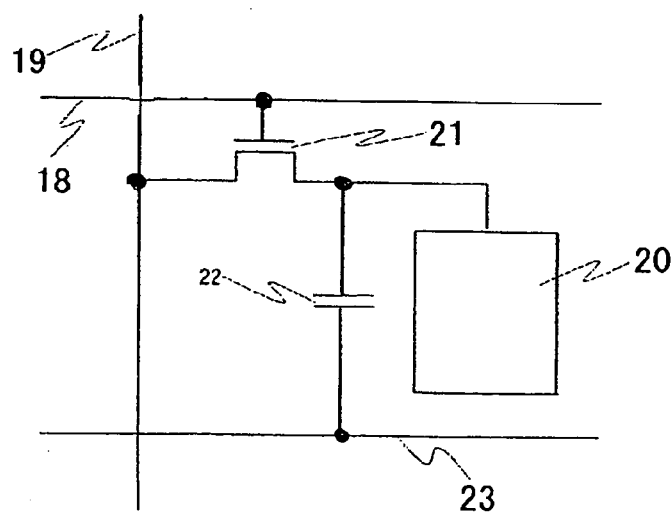
FIG. 4B is an equivalent circuit diagram of a display pixel of the liquid crystal panel.

Operation of the equivalent circuit diagram of FIG. 4B will now be explained.

When image data is output to the signal line 19, and a row selecting pulse signal is output to the scanning line 18 in synchronization therewith, the source-drain of the TFT becomes conductive. The image data is then written from the signal line 19 via the TFT 21 to the pixel electrode 20. A voltage corresponding to the provided image data is applied to each pixel electrode 20. The pixel electrode 20 applied with the voltage drives the liquid crystal layer 17 facing thereto. The display image as a whole is thereby formed.

An ITO (indium tin oxide) electrode 24 serving as a common electrode is formed on a surface contacting the liquid crystal layer 17 of the second transparent substrate 16 so as to face the pixel electrodes 20.

The organic electroluminescence device 9 is formed by stacking a transparent electrode made of ITO, an organic layer and a metal electrode on a glass substrate.

When voltage is applied between the electrodes of the organic electroluminescence device 9, a luminescent layer in the organic layer emits white light. The light emitted from the luminescent layer passes through the glass substrate and exits to the exterior side.

The electrodes and the organic layer of the organic electroluminescence device 9 are planar. When voltage is applied to the electrodes of the organic electroluminescence device 9, light of the same color is simultaneously emitted at various locations in the luminescent layer.

Figure 3A:
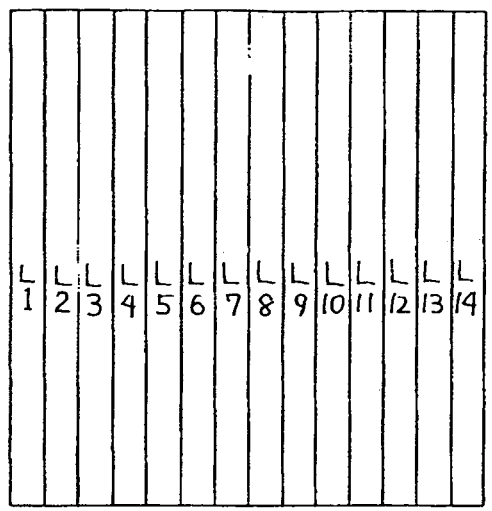
FIGS. 3A and 3B are diagrams each showing a left eye image and a right eye image according to the first, a second and a third embodiment of the present invention.
Figure 3B:
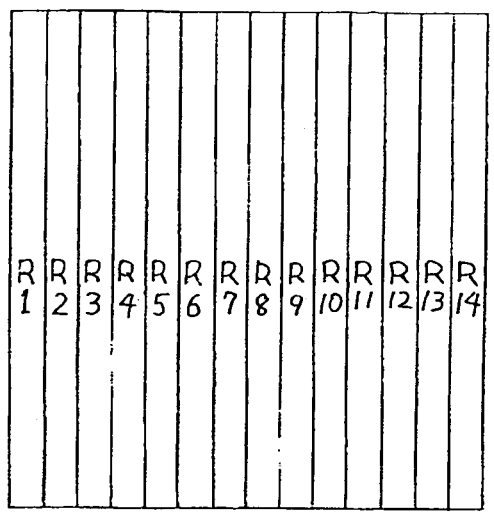

The image signal output section 13 includes an information processor, such as a micro-computer, and provides a left eye image and a right eye image, shown in FIGS. 3A and 3B, respectively, to the liquid crystal panel 10. More specifically, the image signal output section 13 equally divides each of the left eye image and the right eye image into a plurality of strip-shaped divided images, and provides the image data of each divided images to the relevant pixel (pixel column) 2 or 3. The image signal output section 13 provides the image data for displaying one of either the left eye image or the right eye image to pixel 2, and provides the image data for displaying the other image, different from that of pixel 2, to pixel 3. Further, the image signal output section 13 provides the image data to pixels 2 and 3 so that the left eye image and the right eye image are alternately displayed for every predetermined cycle period. Thus, the left eye image and the right eye image appear in alternate shifts at a plurality of positions (positions A, B of FIG. 1) spaced apart in the horizontal direction at the front of the liquid crystal panel 10.

Figure 3C:
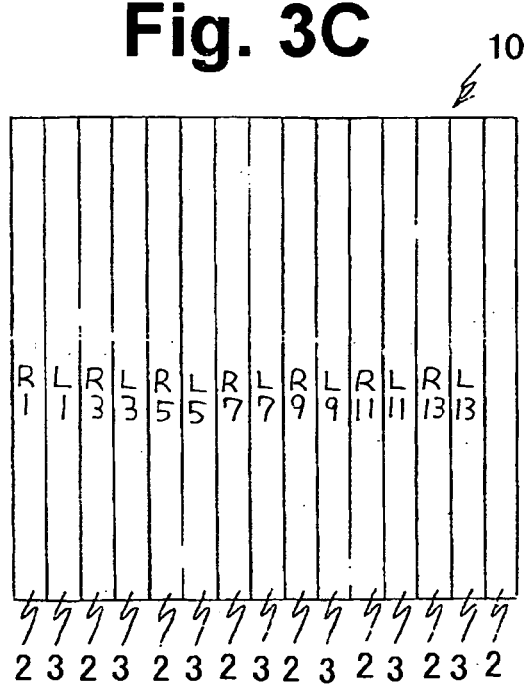
FIGS. 3C and 3D are diagrams showing two images alternately displayed on a liquid crystal panel of the first, the second, and the third embodiments.
Figure 3D:
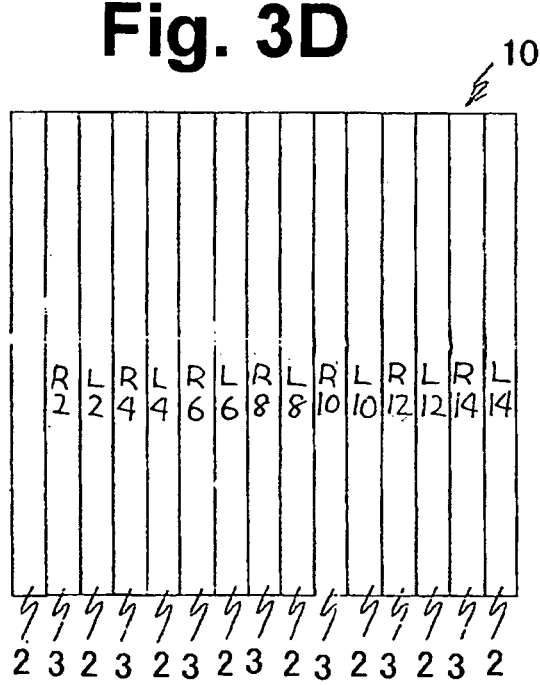

The image signal output section 13 uses the left eye divided images (L1, L2, . . . , L14), shown in FIG. 3A, and the right eye divided images (R1, R2, . . . , R14), shown in FIG. 3B, both of which are divided in the horizontal direction of the liquid crystal panel 10 to generate the image data of a mixed image, shown in FIG. 3C, and image data of a mixed image, shown in FIG. 3D, and alternately provides the image data of the mixed image of FIG. 3C and the image data of the mixed image of FIG. 3D to the liquid crystal panel 10 at a predetermined cycle.

In accordance with the image data of the mixed image shown in FIG. 3C, a plurality of pixels 2 display the left eye divided images (L2, L4, . . . , L14) in even columns, and a plurality of pixels 3 display the right eye divided images (R1, R3, . . . , R13) in odd columns.

Further, in accordance with the image data of the mixed image shown in FIG. 3D, a plurality of pixels 2 display the image data of the right eye divided images (R2, R4, . . . , R14) in even columns, and a plurality of pixels 2 display the image data of the left eye divided images (L1, L3, . . . , L13) in odd columns.

The parallax barrier 11 includes two transparent glasses 25 and 26 arranged parallel to each other, transparent electrodes 28 and 29 arranged so as to face each other on an inner surface of the transparent glasses 25 and 26, respectively, a liquid crystal 27 included between the transparent glasses 25 and 26, and the polarizing plate 32 arranged on a light-emission side. The transparent electrodes 28 and 29, and the liquid crystal 27 form slit regions 5 and 6. The parallax barrier 11 is arranged so that one slit region faces one pixel.

The slit control section 14 includes a logic circuit for controlling each slit region 5 and 6 of the parallax barrier 11 independently, and a driving circuit for applying a predetermined driving voltage to each transparent electrode 28 and 29. The logic circuit controls the slit regions 5 and 6 so that light passes through every two slit regions in the horizontal direction of the liquid crystal panel 10. When the slit region 5 allows light to transmit therethrough, for example, the slit region 6 prohibits or shields light to pass therethrough. The logic circuit alternately switches the transmitting and the shielding of light by the slit regions 5 and 6. This switching control is performed in response to a signal from the image signal output section 13 and in synchronization with the switching of a display image of the liquid crystal panel 10.

The lenticular lens 12 includes a plurality of cylindrical lens portions, same in number with the slit regions 5 and 6 of the parallax barrier 11, and in parallel with the slit regions 5 and 6. The plurality of cylindrical lens portions is formed, for example, by using a die and processing the surface of an acrylic board.

In the liquid crystal display device 8, the organic electroluminescence device 9 and the liquid crystal panel 10 are arranged facing each other, and the light-emission surface of the liquid crystal panel 10 and the parallax barrier 11 are arranged facing each other. Further, the lenticular lens 12 is arranged facing the light-emission surface of the parallax barrier 11.

The functions of the display unit 1 configured as above will now be explained with reference to FIGS. 1 to 3.

When a voltage is applied to the electrodes of the organic electroluminescence device 9, the organic layer emits white light. The light exits toward the liquid crystal panel 10.

The light entering the liquid crystal panel 10 passes through each pixel 2 and 3 of the liquid crystal panel 10.

The image signal output section 13 provides the image data of the right eye divided images (R1, R3, . . . , R13) in odd columns to a plurality of pixels 2 and the image data of the left eye divided images (L1, L3, . . . , L13) in odd columns to a plurality of pixels 3. The pixels 2 and 3 thus display respective images.

The light passing through each pixel 2 and 3 enters the parallax barrier 11.

A voltage signal is provided from the slit control section 14 to the transparent electrodes 28 and 29 of the slit regions 5 and 6 of the parallax barrier 11, which voltage signal allows the slit region 6 to transmit light and prohibits the slit region 5 to transmit light. In this case, light passing through each pixel 2 and 3 passes through the slit region 6, and as shown in FIG. 1, becomes light traveling toward a position (position A) where each pixel 2 displaying the right eye image and the slit region 6 appears as if overlapping each other. The light passing through the slit region 6 passes through the cylindrical lens portion of the lenticular lens 12 and converges to a point (position A). Thus, at position A, the observer recognizes the right eye image including R1, R3, . . . , R13 of high intensity as the entire display unit 1. However, at position A, light from pixels 3 displaying the left eye image is shielded by the slit regions 5. Therefore, at position A, light passing through pixels 3 can not be seen and only the right eye image is recognized.

Similarly, at position B, each pixel 3 displaying the left eye image and the slit region 6 appear as if overlapping one another. Therefore, if the left eye of the observer in front of the display unit 1 is at position B, the observer recognizes the left eye image including L1, L3, . . . , L13 as the entire display unit 1. However, at position B, light from pixels 2 displaying the right eye image is shielded by the slit regions 5. Therefore, at position B, the right eye image can not be seen and only the left eye image is recognized.

Figure 2:
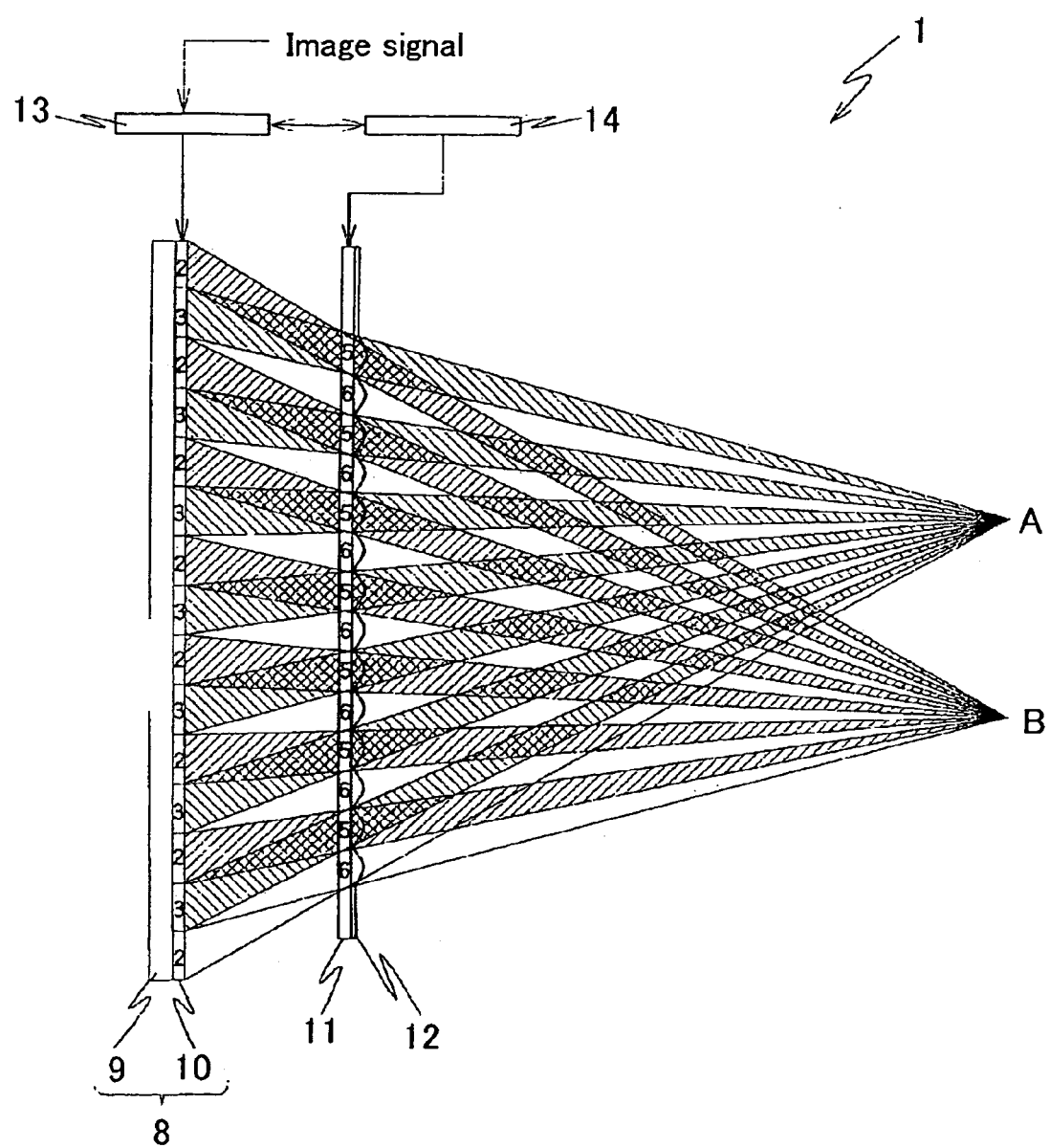

As shown in FIG. 2, the image signal output section 13 then provides the right eye divided images (R2, R4, . . . , R14) in even columns to each pixel 3, displaying the left eye image, and the left eye divided images (L2, L4, . . . , L14) in even columns to each pixel 2, displaying the right eye image.

Therefore, at position A where the right eye image is recognized with the slit region 6 and the pixel 2, the right eye image including the right eye divided images (R2, R4, . . . , R14) in even columns is now recognized with the slit region 5 and pixel 3. Similarly, at position B, the left eye image including the left eye divided images (L2, L4, . . . , L14) in even columns is now recognized with the slit region 5 and pixel 2.

By repeating the switching of the left and the right images at each pixel 2 and 3 and the switching of the slit regions 5 and 6 in a short cycle, the image displayed before switching and the image displayed after switching overlap one another, and thus the observer recognizes the images as one image. Since all of the pixels 2 and 3 of the liquid crystal panel 10 contribute to displaying the left and the right images, a three-dimensional image is displayed without any lowering of horizontal resolution even when compared to the image observed when a corresponding two-dimensional image is displayed on the relevant display unit.

Further, light passing through the slit regions 5 and 6 converge to a predetermined observation point by the cylindrical lens portion of the lenticular lens 12, and thus a three-dimensional image of high intensity is displayed.

The first embodiment has the following advantages.

(1) Three-dimensional image is displayed at a predetermined position without any lowering of horizontal resolution even when compared to a corresponding two-dimensional image displayed on the relevant display unit. Further, light passing through the parallax barrier converges to the observation point by the lenticular lens, and thus the three-dimensional image of high intensity is displayed at a predetermined position.

A display unit according to a second embodiment of the present invention will now be described.

Figure 5:
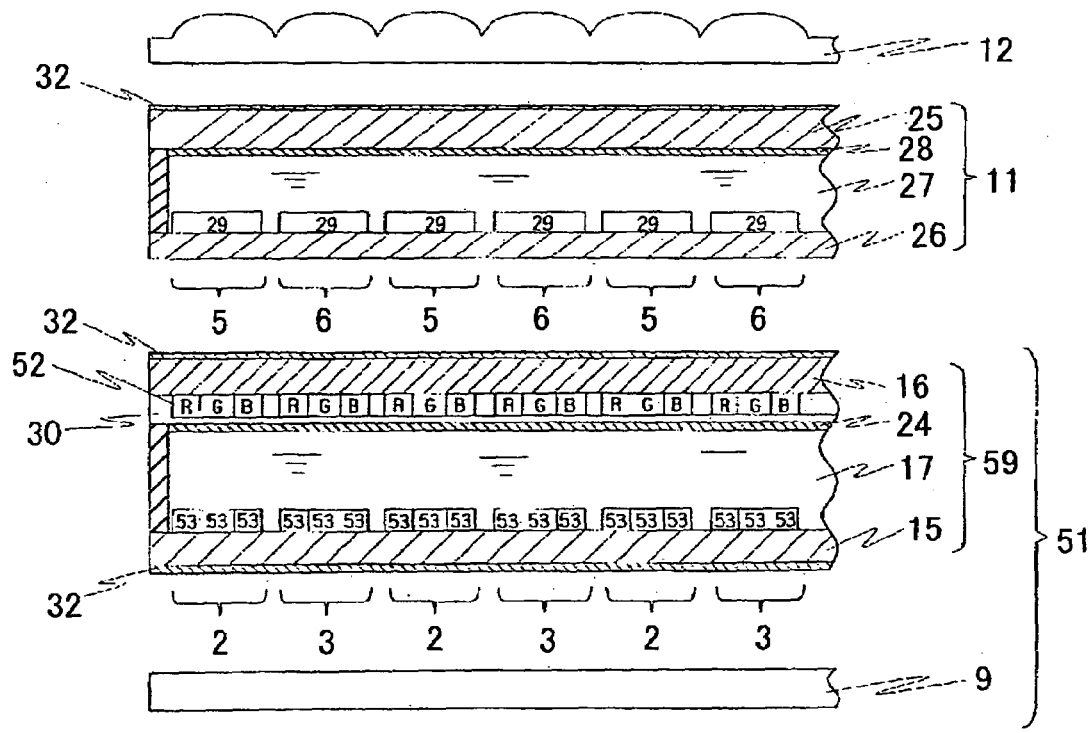
FIG. 5 is a partial sectional view of a display unit according to the second embodiment of the present invention.
Figure 6:
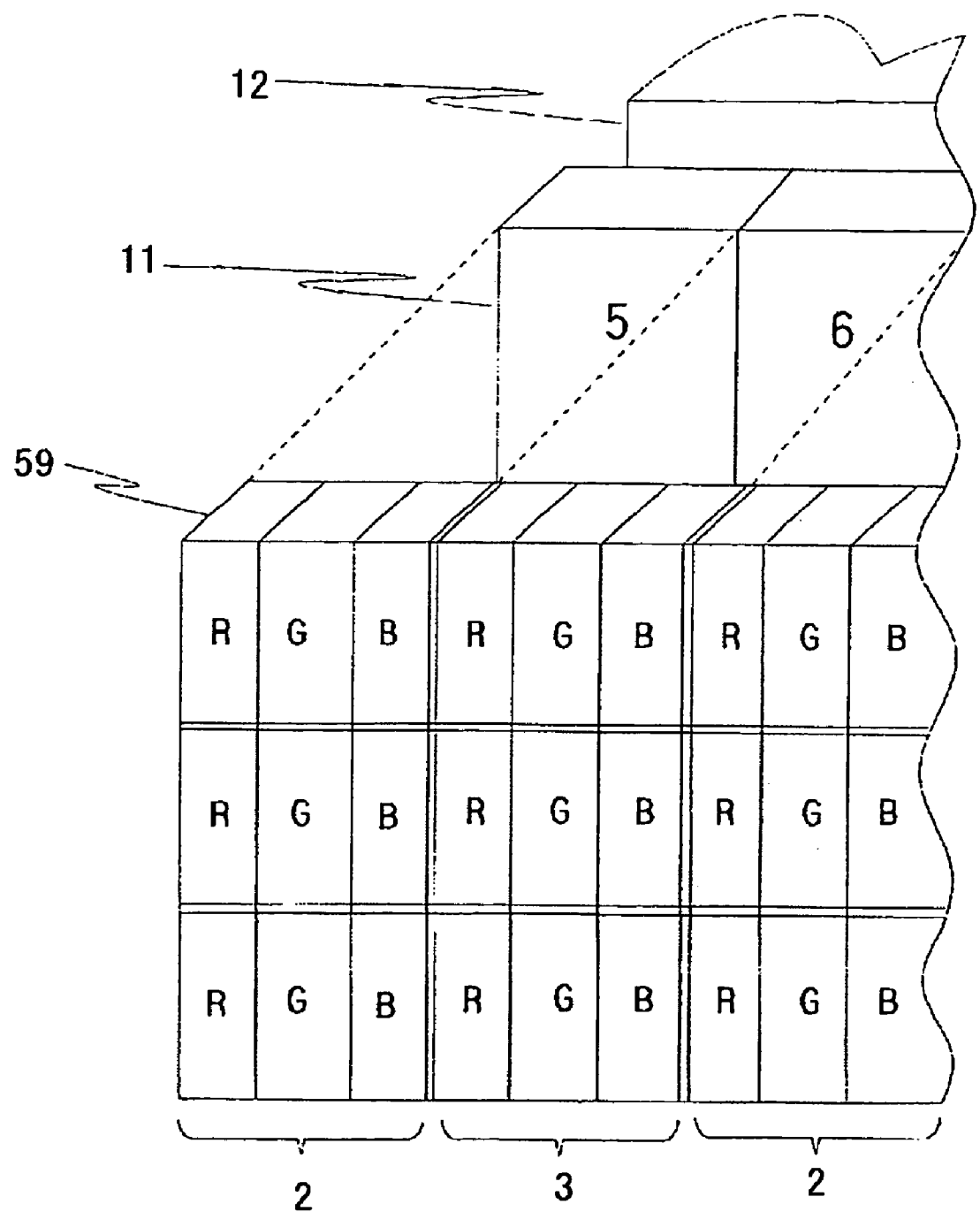
FIG. 6 is a partial perspective view of the display unit of FIG. 5.

The liquid crystal panel 59 of the second embodiment includes a color filter 52, a protective film 30, and an ITO electrode 24 functioning as a common electrode stacked one over the other between the second transparent substrate 16 and the liquid crystal layer 17, as shown in FIG. 5. A pixel electrode 53, and a sub-pixel (not shown) including a scanning line, a signal line, a TFT, an auxiliary capacitor and an auxiliary capacitor line are arranged on a surface contacting the liquid crystal layer 17 of the first transparent substrate 15 so that one pixel displays three colors of R, G, and B. One pixel includes three pixel electrodes 53 aligned in the horizontal direction of the liquid crystal panel. The color filter 52 is formed so that R, G, and B are displayed side-by-side in the horizontal direction of the liquid crystal panel 59 in the pixel, as shown in FIG. 6.

The second embodiment has, in addition to the above mentioned advantage (1), the following advantage.

The light of three primary colors of R, G, and B each exits from each pixel of the transmissive image display panel 10, passes through the parallax barrier and the lenticular lens individually, and displays a color image at each observation point. Thus, a plurality of images of high intensity is each displayed at a different position. Further, an existing liquid crystal panel may be used.

A display unit according to a third embodiment of the present invention will now be described.

Figure 7:
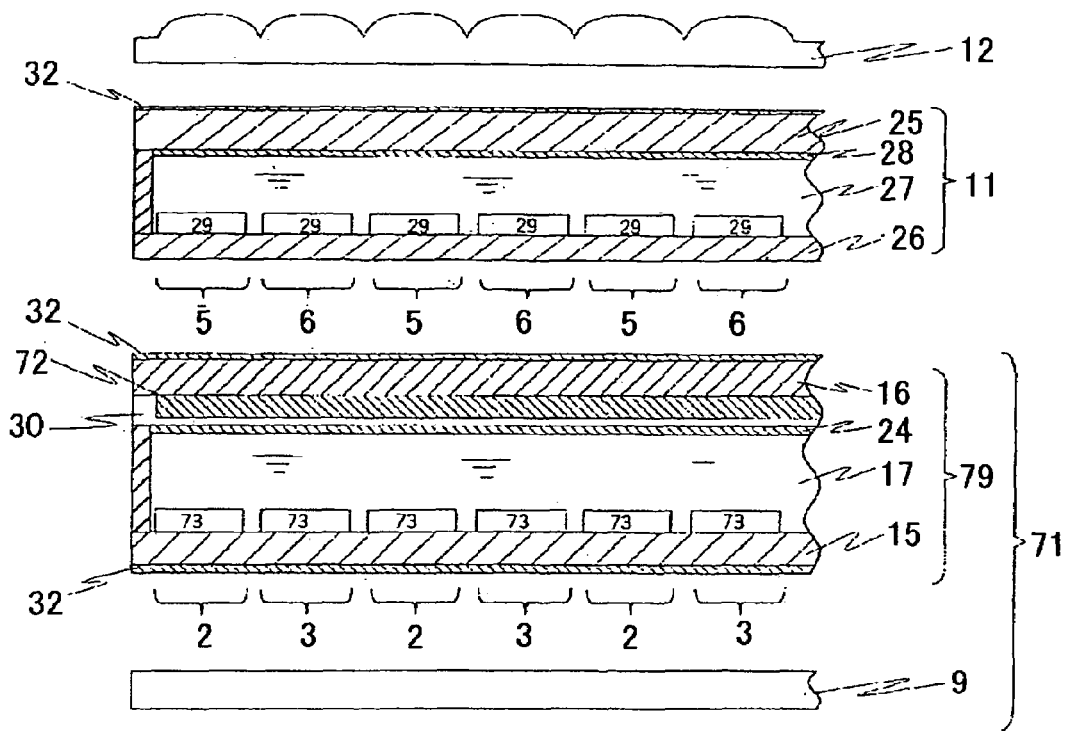
FIG. 7 is a partial sectional view of a display unit according to the third embodiment of the present invention.
Figure 8:
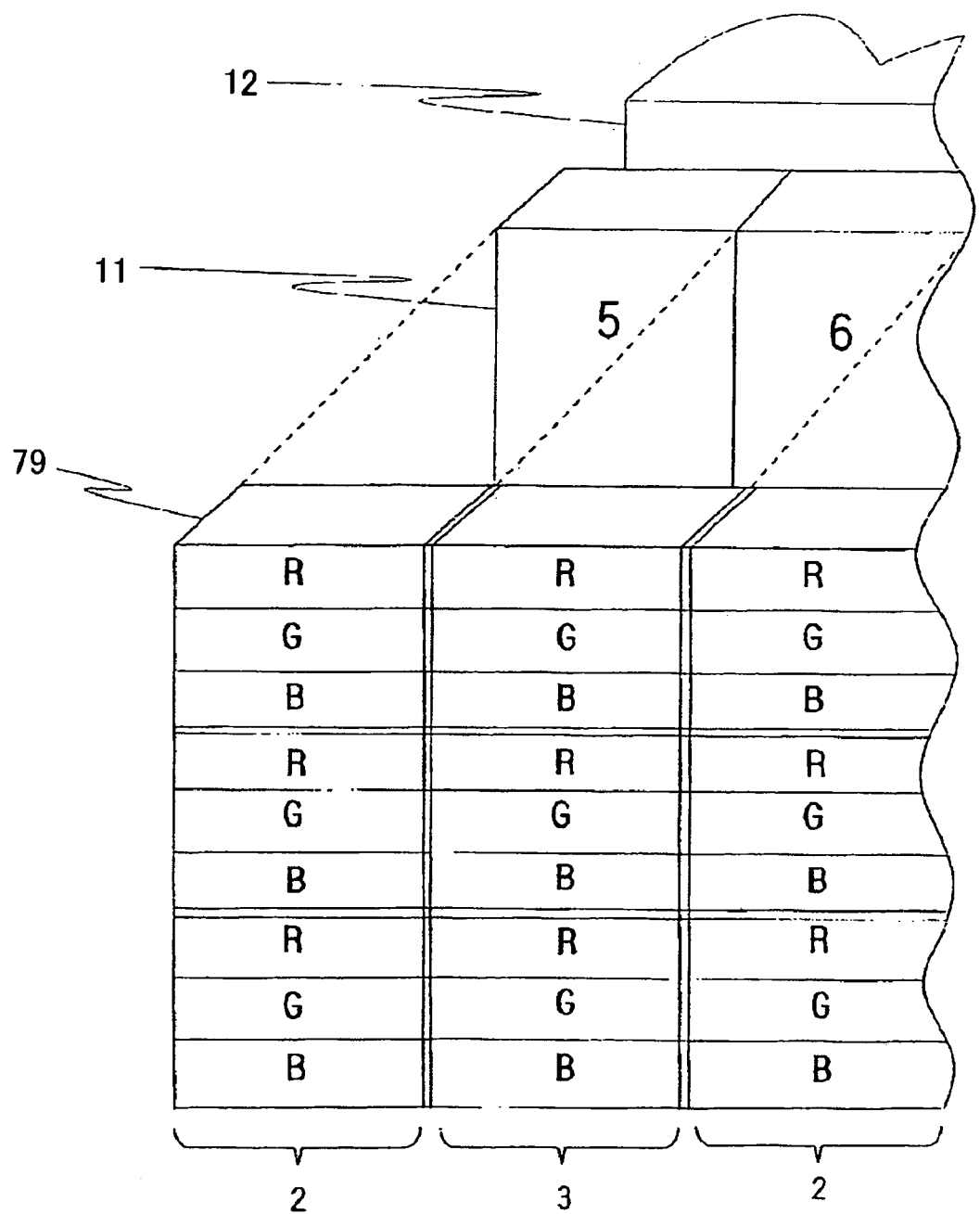
FIG. 8 is a partial perspective view of the display unit of FIG. 7.

The liquid crystal panel 79 of the third embodiment includes a color filter 72, a protective film 30, and an ITO electrode 24 functioning as a common electrode in between the second transparent substrate 16 and the liquid crystal layer 17, as shown in FIG. 7. A pixel electrode 73, and three sub-pixels (not shown) including a scanning line, a signal line, a TFT, an auxiliary capacitor and an auxiliary capacitor line, aligned in the vertical direction of the liquid crystal panel 79, are arranged in the pixel on a surface contacting the liquid crystal layer 17 of the first transparent substrate 15 so that one pixel displays three colors of R, G, and B. The color filter 72 includes three partitions formed so that the R, G, and B are displayed side-by-side in the vertical direction of the liquid crystal panel 79 in the pixel, as shown in FIG. 8. The other features of the configuration are the same as that of the first embodiment.

According to the third embodiment, a plurality of color images is displayed each at a different position without using the directivity member. Further, each sub-pixel aligned in the vertical direction in each pixel receives substantially an equal amount of light from the light-emitting region aligned in the horizontal direction, and thus the chromaticity of the image displayed by the emitted light-emitting region does not change.

A display unit 90 for displaying a plurality of (N) images according to a fourth embodiment of the present invention will now be described with reference to FIGS. 9 to 13.

Figure 9:
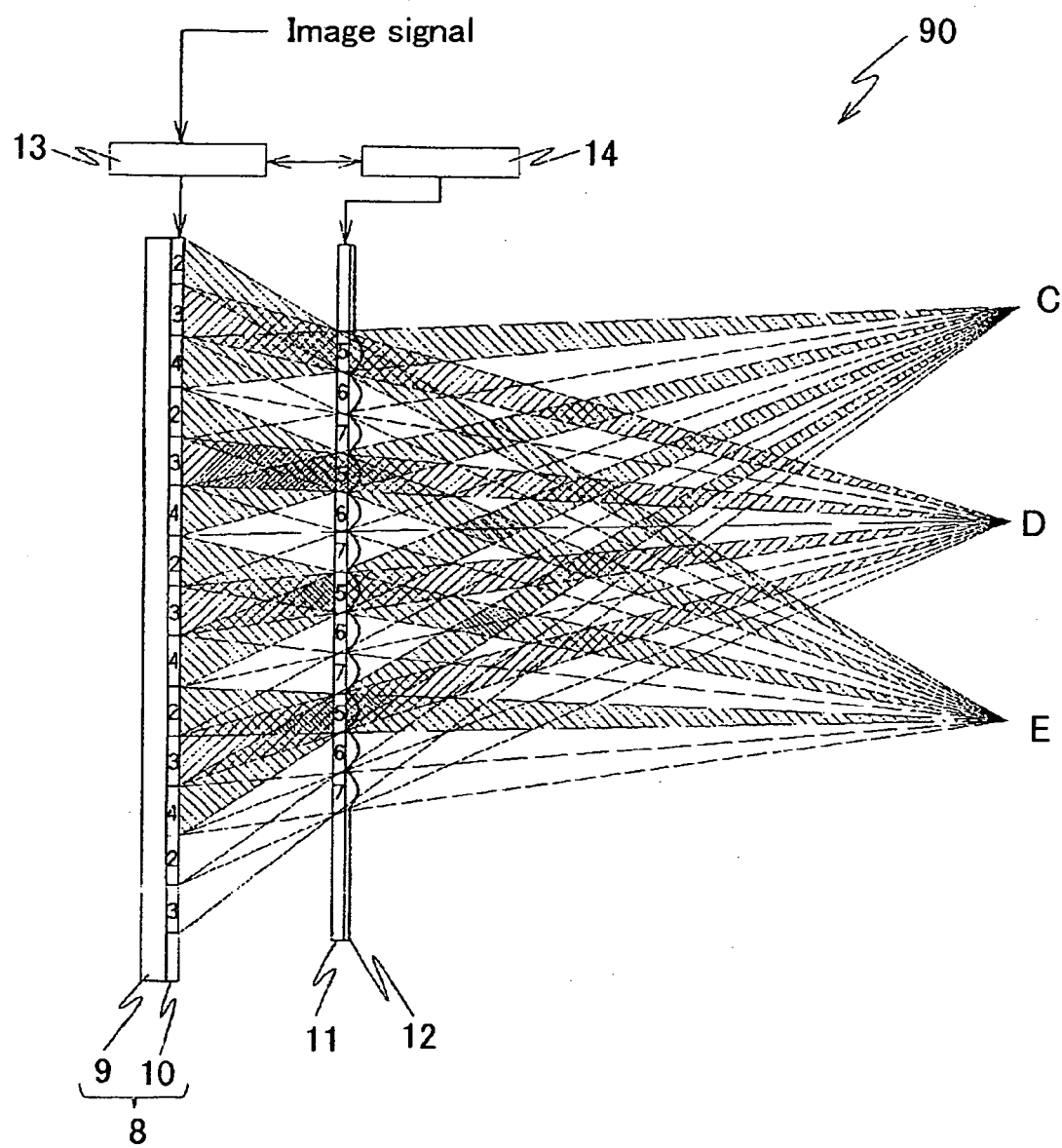
FIGS. 9 to 11 are diagrams showing light path switching y a display unit according to a fourth embodiment of the present invention.

FIG. 9 shows a display unit 90 for displaying three different images α, β, and γ (N=3).

The image signal output section 13 includes an information processor, such as a micro-computer, and the like. The image signal output section 13 generates image data for displaying one of the images α, β, and γ at pixel 2, image data for displaying an image different from pixels 2 and 4 at pixel 3, and image data for displaying an image different from pixels 2 and 3 at pixel 4 from the image signal provided from the external circuit, and provides such image data to the liquid crystal panel 10. Thus, three different images α, β, and γ are displayed by the pixels 2, 3, and 4. The image signal output section 13 provides the image data of three images α, β, and γ to the respective pixels 2, 3, and 4 for every predetermined cycle period so that images α, β, and γ are counter-changeably displayed for every predetermined cycle period.

Figure 12A:
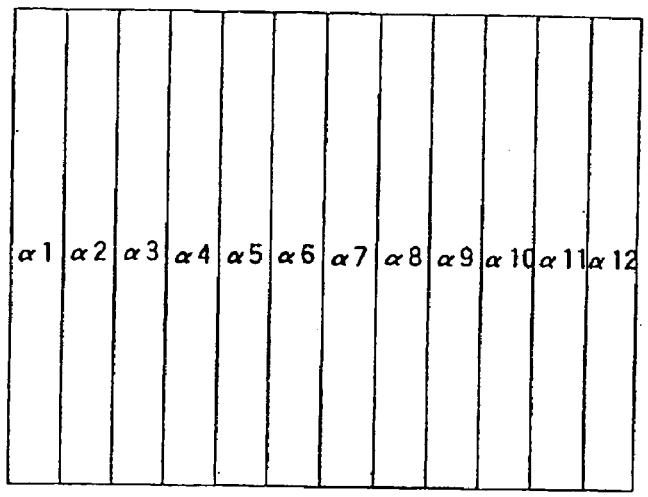
FIGS. 12A to 12C are diagrams each showing three different types of images.
Figure 12B:
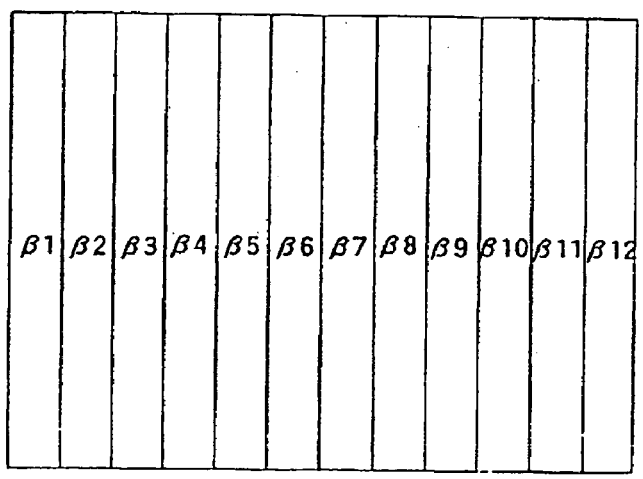
Figure 12C:
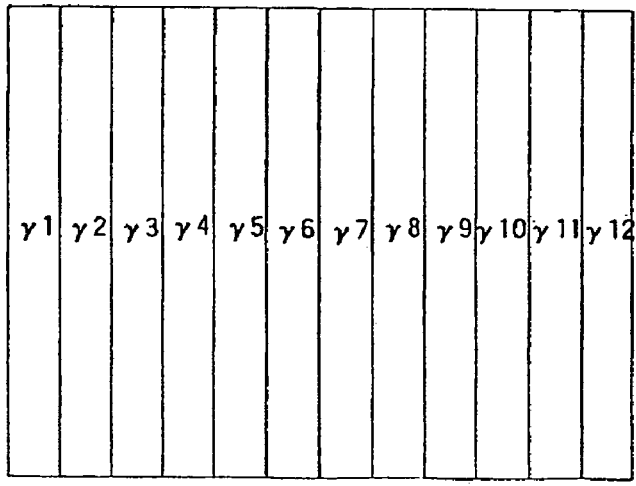
Figure 13A:
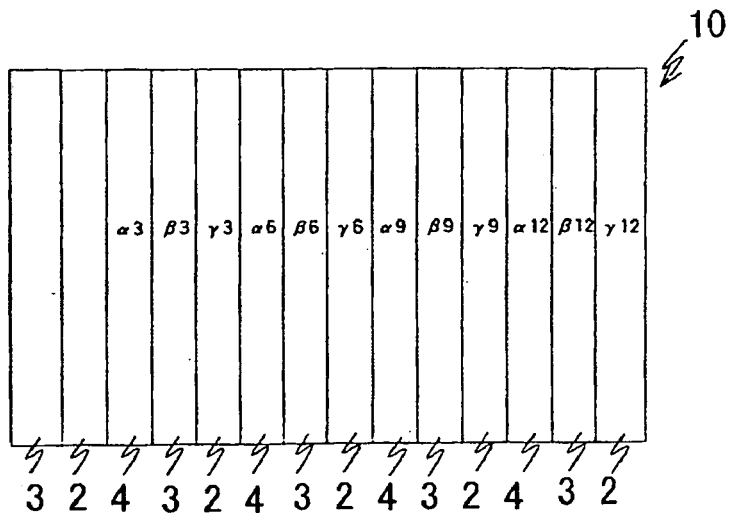
FIGS. 13A to 13C are diagrams each showing three images alternately displayed on the liquid crystal panel.

More specifically, as shown in FIG. 13A, the image signal output section 13 prepares α divided images (α1, α2, . . . , α12), as shown in FIG. 12A, β divided images (β1, β2, . . . , β12), as shown in FIG. 12B, and γ divided images (γ1, γ2, . . . , γ12), as shown in FIG. 12C, equally divided in the horizontal direction of the liquid crystal panel 10. The image signal output section 13 provides image data of the γ divided images including γ3, γ6, γ9, γ12 to pixel 2, image data of β divided images including β3, β6, β9, β12 to pixel 3, and image data of a divided images including α3, α6, α9, α12 to pixel 4.

Figure 13B:
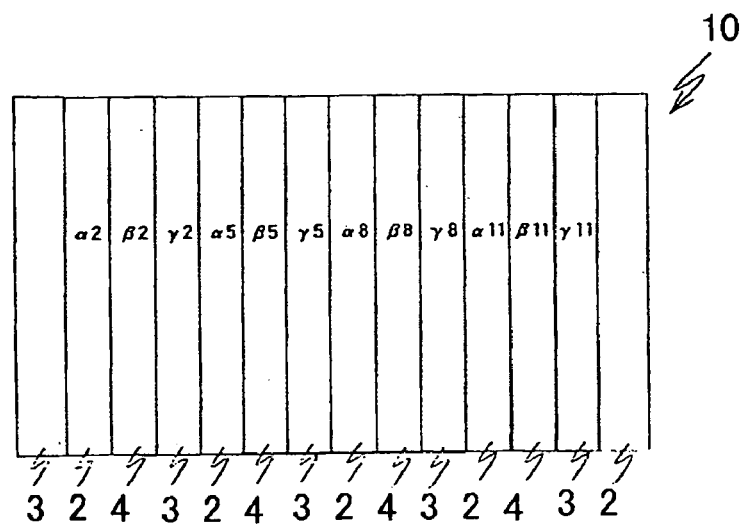

As shown in FIG. 13B, after a predetermined cycle period, the image signal output section 13 provides image data of α divided images including α2, α5, α8, all to pixel 2, image data of γ divided images including γ2, γ5, γ8, γ11 to pixel 3, and image data of β divided images including β2, β5, β8, β11 to pixel 4.

As shown in FIG. 3C, after another further predetermined cycle period, the image signal output section 13 provides image data of β divided images including β1, β4, β7, β10 to pixel 2, image data of a divided images including α1, α4, α7, α10 to pixel 3, and image data of γ divided images including γ1, γ4, γ7, γ10 to pixel 4.

The slit control section 14 includes a logic circuit for controlling the slit regions 5, 6 and 7 of the parallax barrier 11, and a driving circuit for applying a predetermined driving voltage to the transparent electrodes 28 and 29 of the parallax barrier 11. The slit control section 14 controls the slit regions 5, 6 and 7 so that light passes through every three slit regions in the horizontal direction of the liquid crystal panel 10. The slit control section 14 controls the parallax barrier 11 so that when, for example, the slit region 5 transmits light, the slit regions 6 and 7 shield light. The slit control section 14 controls the parallax barrier 11 so that when, for example, the slit region 6 transmits light, the slit regions 5 and 7 shield light. The slit control section 14 controls the parallax barrier 11 so that when, for example, the slit region 7 transmits light, the slit regions 5 and 6 shield light. The operations of the slit regions 5, 6 and 7 are performed in response to the signal from the image signal output section 13 and in synchronization with the switching of a display image of the liquid crystal panel 10.

Other features of the fourth embodiment are the same as those of the first embodiment.

The function of the display unit 90 will now be explained with reference to FIGS. 9 to 11.

The display unit 90 drives the following steps S1, S2 and S3 as one cycle. Thus, a multiple stereoscopic image is displayed without any lowering of horizontal resolution even when compared to the image observed when the two-dimensional image is displayed on the transmissive liquid crystal display unit 90.

(Step S1)

The slit control section 14 controls the slit regions so that the slit regions 6 and 7 shield light and the slit region 5 transmits light, as shown in FIG. 9.

In synchronization therewith, the image signal output section 13 provides the image data of the γ divided images including γ3, γ6, γ9, γ12 to pixel 2, the image data of β divided images including β3, β6, β9, β12 to pixel 3, and the image data of the α divided images including α3, α6, α9, α12 to pixel 4. The image shown in FIG. 13A is thus displayed on the liquid crystal panel 10. At position E in front of the display unit 90, each pixel 2 displaying the image γ and the slit region 5 appear as if overlapping one another. Therefore, the observer at position E recognizes the image γ including γ3, γ6, γ9, γ12 as the entire liquid crystal panel 10. However, since each pixel 3 displaying the image β and each pixel 4 displaying the image α are positioned in front of the slit regions 6 and 7 at position E, light that passes through the pixels 3 and 4 can not be seen.

Similarly, at position C where each pixel 4 displaying the image α and the slit region 5 appear as if overlapping one another, only the image α is recognized, and at position D where each pixel 3 displaying the image β and the slit region 5 appear as if overlapping one another, only the image β is recognized.

(Step S2)

Figure 10:
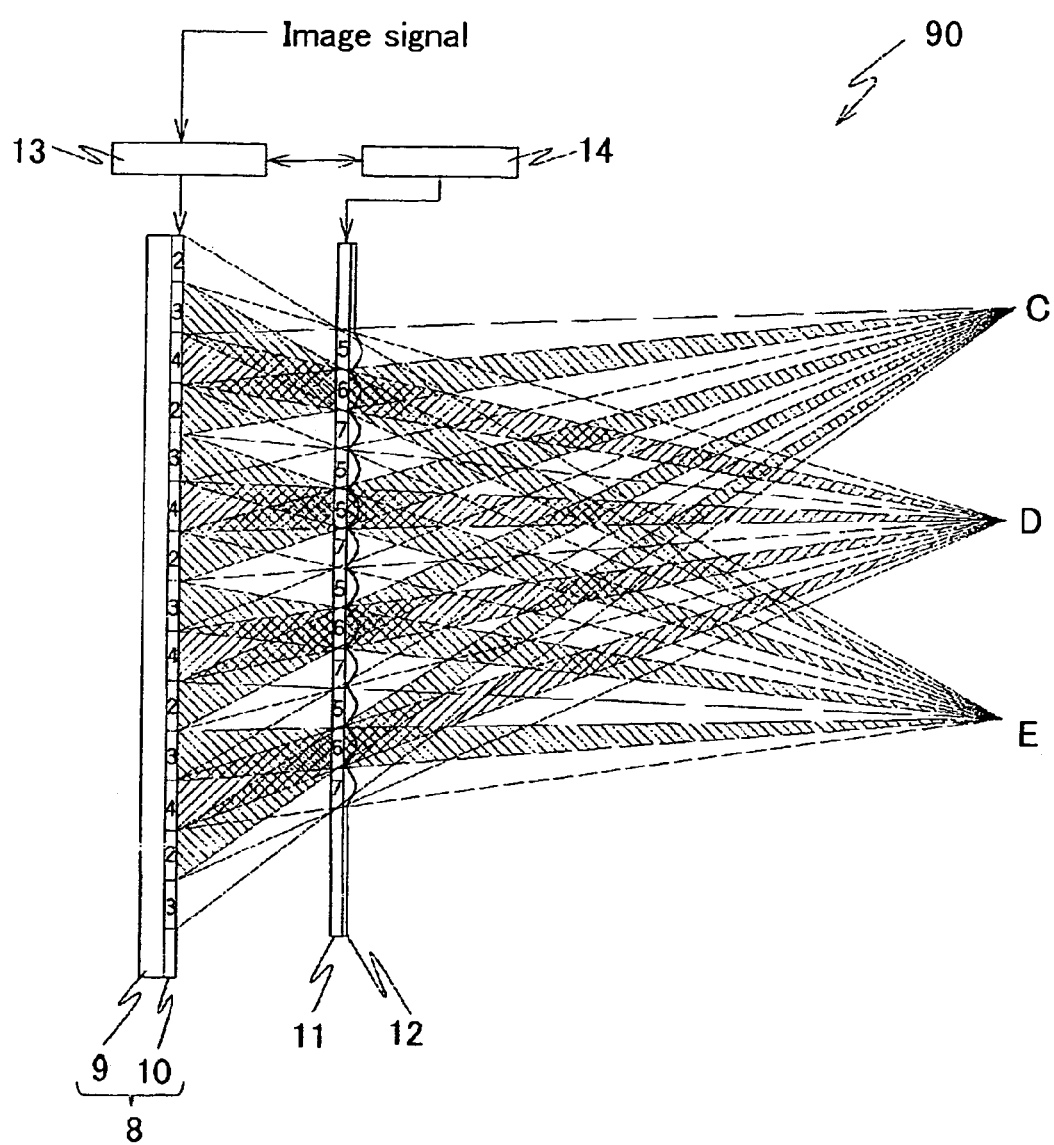

The slit control section 14 controls the slit regions so that slit regions 5 and 7 shield light and the slit region 6 transmits light, as shown in FIG. 10.

In synchronization therewith, the image signal output section 13 provides the image data of the image α including α2, α5, α8, α11 to each pixel 2, displaying the image γ in step S1, the image data of the image γ including γ2, γ5, γ8, γ11 to each pixel 3, displaying the image β in step S1, and provides the image data of the image β includintg β2, β5, β8, β11 to each pixel 4, displaying the image α in step S1. The image shown in FIG. 13B is thus displayed on the liquid crystal panel 10. At position C where the image α is recognized with the slit region 5 and the pixel 4 in step S1, the observer now recognizes the image α including α2, α5, α8, αll with the slit region 6 and the pixel 2. Similarly, at position D where the image β is recognized in step S1, the observer now recognizes the image β including β2, β5, β8, β11 with the slit region 6 and the pixel 4 in step S2. Further, at position E where the image γ is recognized in step S1, the observer now recognizes the image γ including γ2, γ5, γ8, γ11 with the slit region 6 and the pixel 3 in step S2.

(Step S3)

Figure 11:
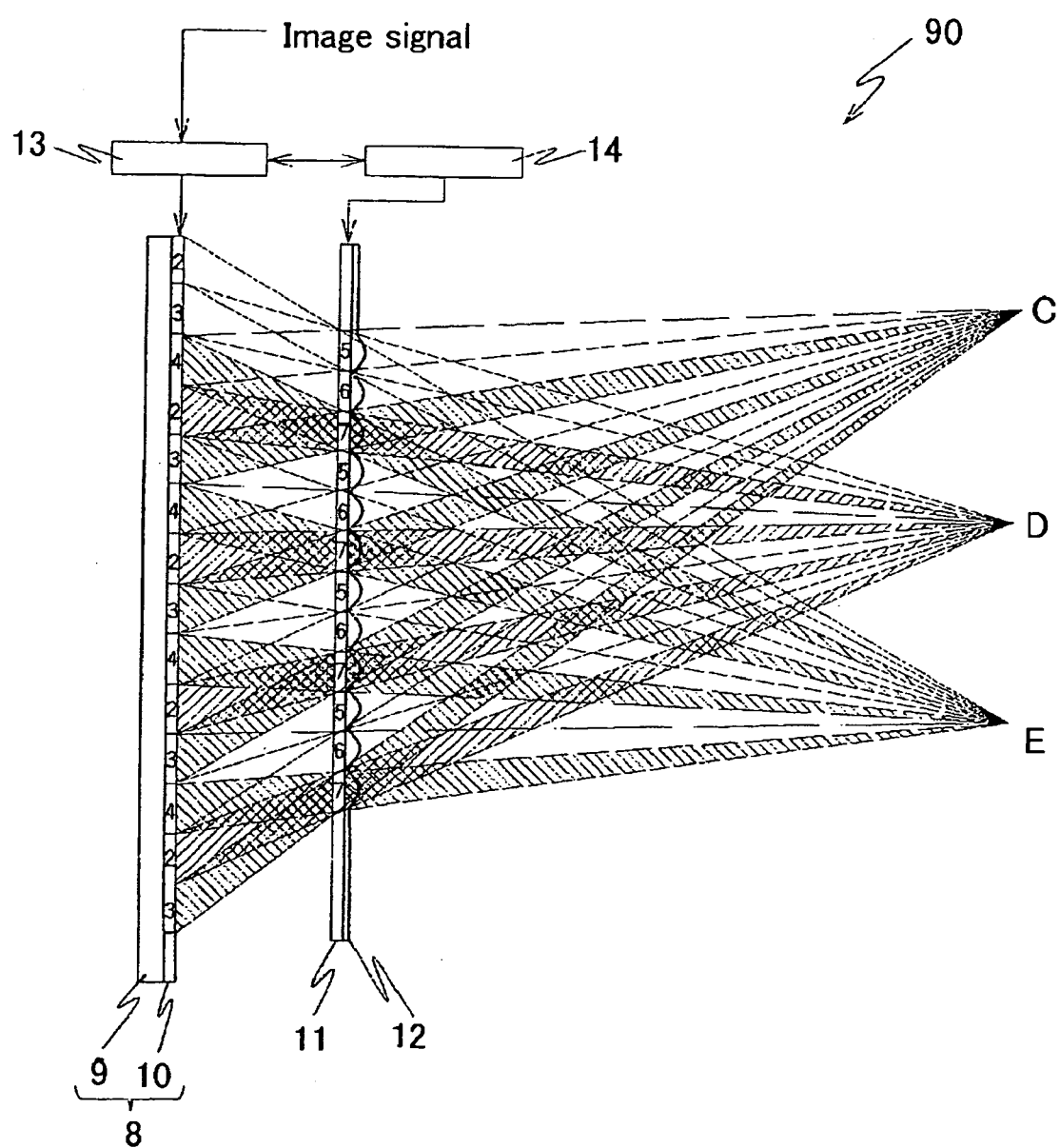

The slit control section 14 controls the slit regions so that slit regions 5 and 6 shield light and the slit region 7 transmits light, as shown in FIG. 11.

Figure 13C:
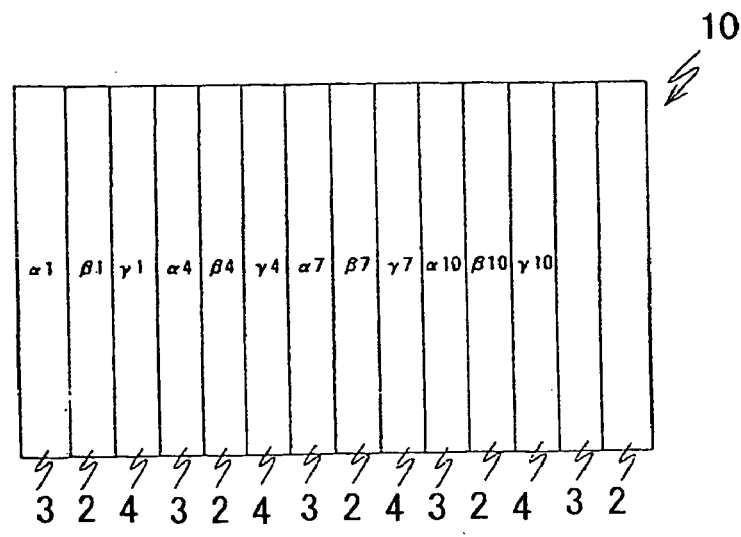

In synchronization therewith, the image signal output section 13 provides the image data of the image β including β1, β4, β7, β10 to each pixel 2, displaying the image α in step S2, the image data of the image γ including γ1, γ4, γ7, γ10 to each pixel 4, displaying the image β in step S2, and the image data of the image α including α1, α4, α7, α10 to each pixel 3, displaying the image γ in step S2. The image shown in FIG. 13C is thus displayed on the liquid crystal panel 10. At position C where the image α is recognized with the slit region 6 and the pixel 2 in step S2, the observer now recognizes the image α including α1, α4, α7, α10 with the slit region 7 and the pixel 3. Similarly, at position D where the image β is recognized in step S2, the image β including β1, β4, β7, β10 is now recognized with the slit region 7 and the pixel 2 in step S3. Further, at position E where the image γ is recognized in step S2, the image γ including γ1, γ4, γ7, γ10 is now recognized with the slit region 7 and the pixel 4 in step S3.

By repeating the cycle of steps S1 to S3 in a short cycle, the observer recognizes as if simultaneously looking at the image displayed in step S1, the image displayed in step S2, and the image displayed in step S3.

Since a plurality of images (left and right images) are displayed using all of the pixels 2, 3, and 4 of the liquid crystal panel 10, the multiple stereoscopic image is displayed without any lowering of horizontal resolution even when compared to the image observed when the two-dimensional image is displayed on the display unit 90.

Further, in the present embodiment, by increasing the number of pixels n, the stereoscopic image may be displayed as if the observer is surrounded by the stereoscopic image.

Figure 14:
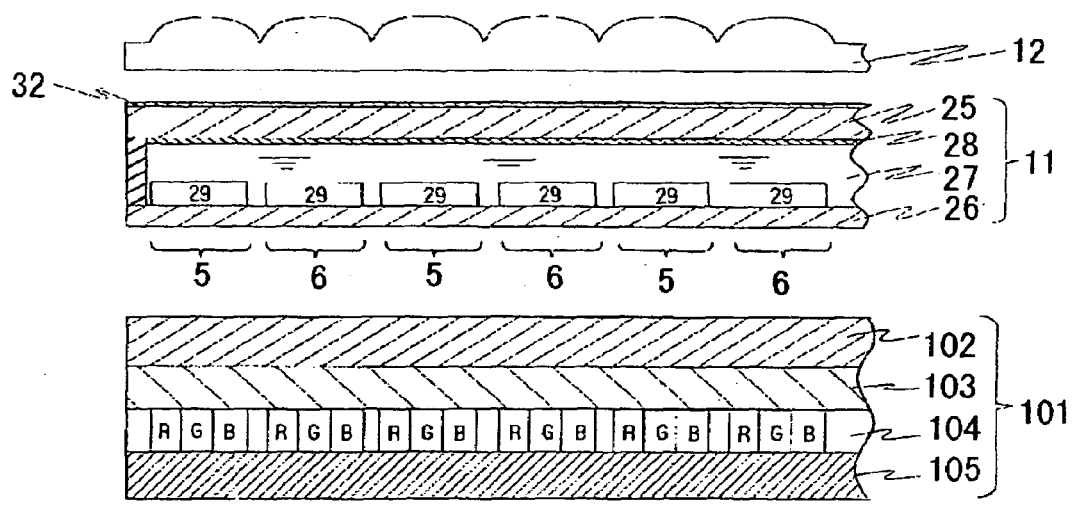
FIG. 14 is a cross sectional view of a display unit according to a fifth embodiment of the present invention.

A display unit according to a fifth embodiment of the present invention will now be described with reference to FIG. 14.

The display unit is the same as the display unit of the first embodiment except that an organic EL display 101 functioning as a display device is used.

The organic EL display 101 may be a conventionally known display, but preferably includes a transparent substrate 102, a transparent electrode 103, a metal electrode 105 having a reflecting/scattering function, and an organic thin-film layer 104.

The organic thin-film layer 104 is a multi-layered stack including a hole injection layer, a hole transport layer, a luminescent layer, an electron transport layer, and an electron injection layer. The light-emitting regions R, G, and B are arranged in plane with and adjacent with respect to each other in the luminescent layer of the organic thin-film layer 104. The light-emitting regions R, G, and B are made of a material emitting one of the three colors, red, green and blue. A set of three light-emitting regions R, G and B forms one pixel.

The organic thin-film layer 104 may be a single layer including only the light-emitting region; or a multi-layered stack including at least one of the layers of the hole injection layer, the hole transport layer, a hole injection-transport layer, a hole blocking layer, the electron injection layer, the electron transport layer and an electron blocking layer, and the luminescent layer.

In the fifth embodiment, similar advantage as the first embodiment is obtained.

The first to the fifth embodiments may be modified as described below.

In each embodiment, an organic electroluminescence device serving as a back light device is used, but the present invention is not limited thereto, and a line source of, for example, the cold cathodes and a point light source, such as a light-emitting diode or an inorganic electroluminescence device, may be used. Similar advantages as recognized in each embodiment are also obtained in such cases.

Figure 15:
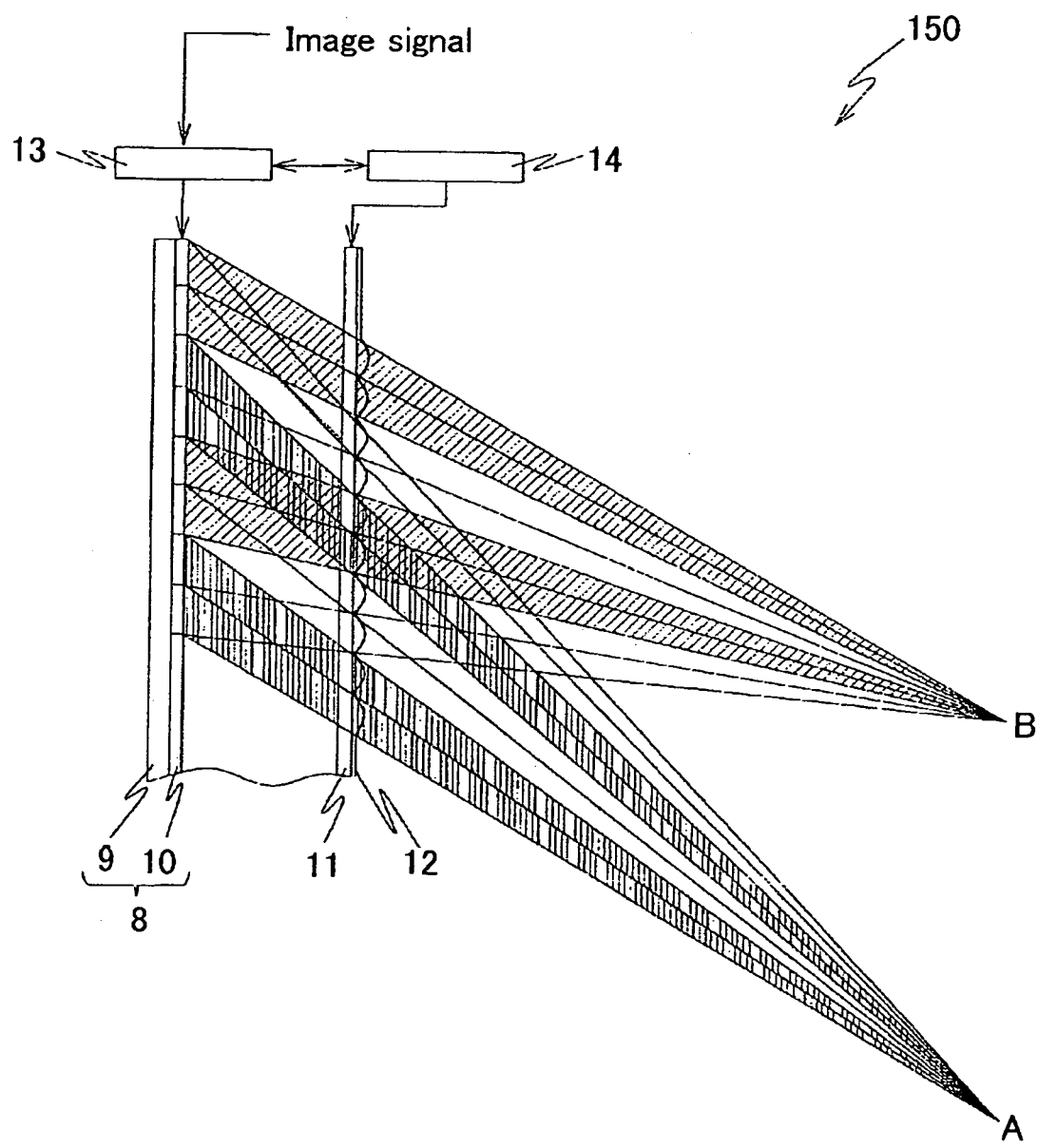
FIG. 15 is a perspective view of a display unit of another embodiment.

In the first, the second and the fourth embodiments, the image signal output section 13 alternately outputs the image data so that the right eye image and the left eye image are alternately displayed for every two images in the horizontal direction of the liquid crystal panel or the organic EL display. However, the present invention is not limited thereto, and for example, in the display unit 150 shown in FIG. 15, the image signal output section 13 may alternately output the image data so that the plurality of first pixels, adjacent to each other, display the right eye image and thereafter, the plurality of second pixels, adjacent to each other, display the left eye image. Here, in correspondence to the switching of the pixels, the transmitting and the shielding of light by the slit region are controlled. In the display unit 150 as well, the three-dimensional image is displayed without any lowering of horizontal resolution compared to the two-dimensional image, and further, the three-dimensional image of high intensity is displayed.

Figure 16:
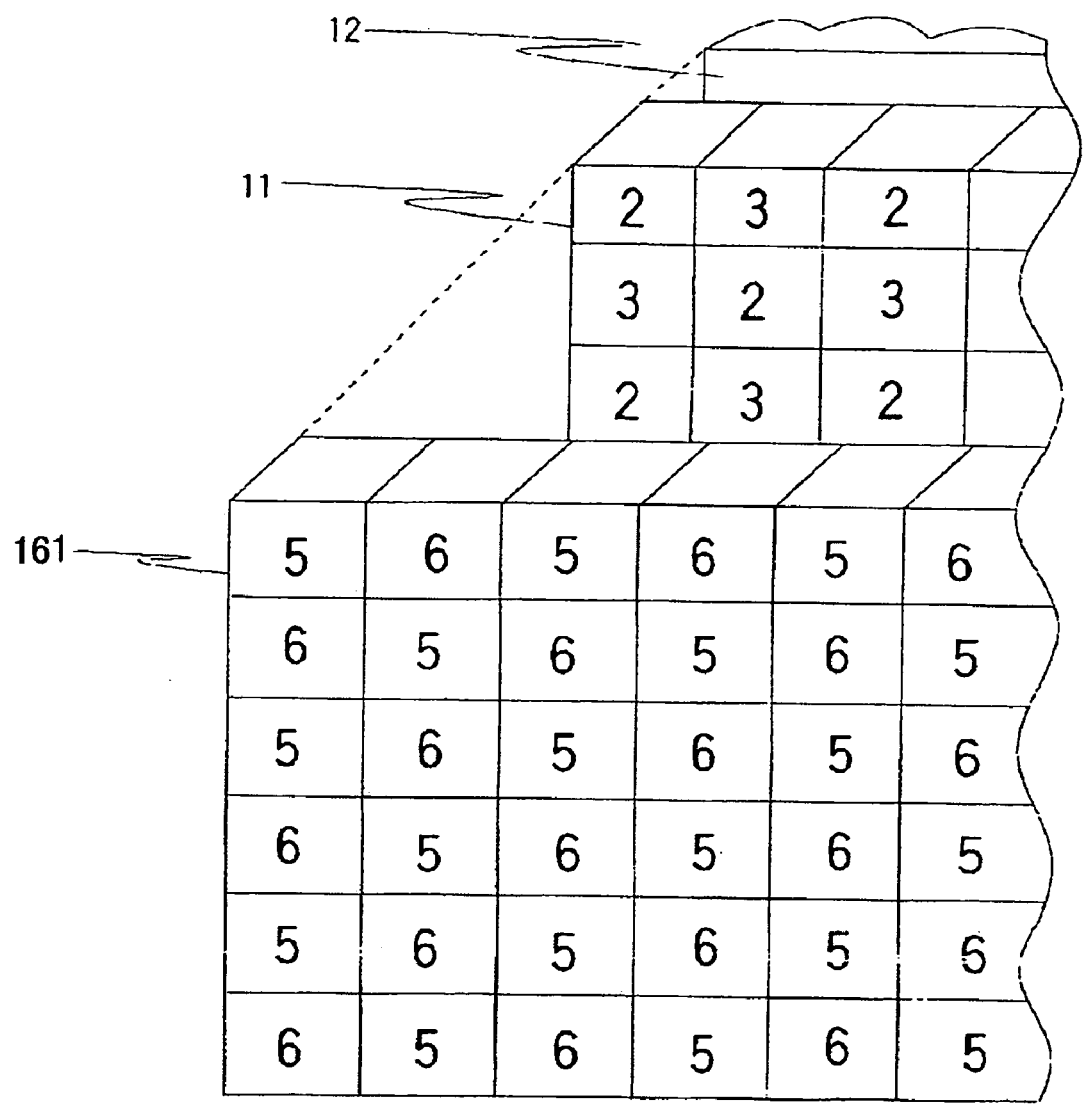
FIG. 16 is a perspective view of a display unit of still another embodiment.

In the first, the second and the fourth embodiments, the image signal output section 13 outputs the image data so that the right eye image and the left eye image are alternately displayed in the horizontal direction of the liquid crystal panel or the organic display, but the present inventions is not limited thereto. As shown in FIG. 16, for example, the image signal output section may output the image data so that the right eye image and the left eye image are alternately displayed for each of the pixels 2 and 3 not only in the horizontal direction of the liquid crystal panel 161 but also in the vertical direction of the liquid crystal panel 161. In correspondence to the switching of the images, the transmitting and the shielding of light by the slit regions are controlled. In this configuration as well, a three-dimensional image is displayed without any lowering of horizontal resolution even when compared to the two-dimensional image displayed on the relevant display unit, and further, a three-dimensional image of high intensity is displayed.

Figure 17:
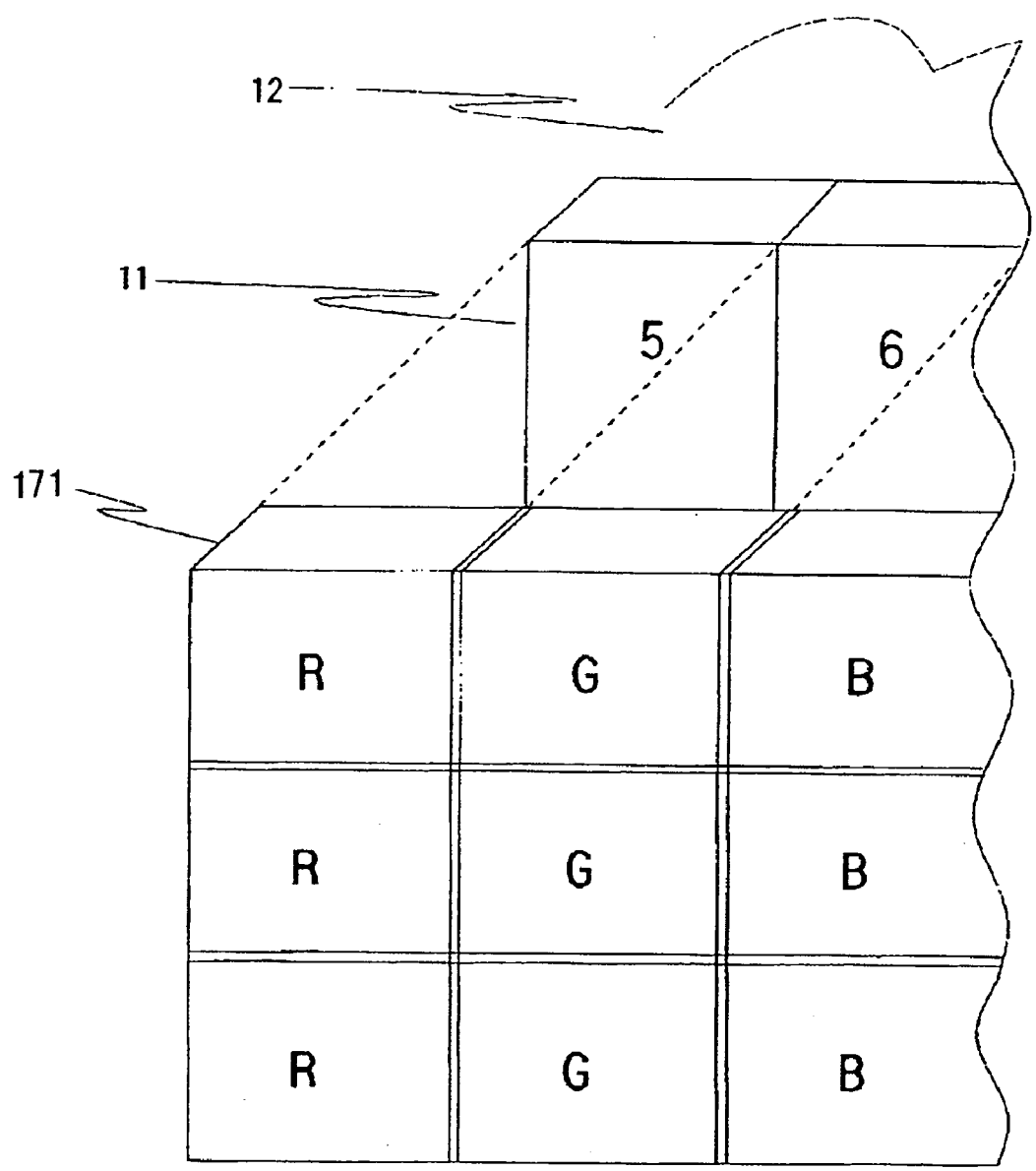
FIG. 17 is a perspective view of a display unit of further embodiment.

In the second and the third embodiments, the parallax barrier is arranged so that one slit region faces one pixel. The parallax barrier may be arranged so that one slit region faces one sub-pixel, as shown in FIG. 17.

In the first, the second and the fourth embodiments, two different images are displayed and in the third embodiment, three different images are displayed, but the number of images to be displayed is not limited, and as long as the control is performed in a similar way as described in the embodiments, the multiple stereoscopic images without any lowering of horizontal resolution is observed.

In the second embodiment, two different color images are displayed, but the number of images to be displayed is not limited and, for example, by substituting the liquid crystal panel 79 of the display unit of the third embodiment for the liquid crystal panel 59 of the second embodiment, a three-dimensional color image may be displayed.

In each embodiment, a liquid crystal panel functioning as the transmissive image display panel is used, but a display panel using a material that selectively transmits light, such as a PLZT (lead lanthanum zicronate titanate), may also be used.

It should be apparent to those skilled in the art that the present invention may be embodied in many other specific forms without departing from the spirit or scope of the invention. Therefore, the present invention is not to be limited to the details given herein, but may be modified within the scope and equivalence of the appended claims.

What is claimed is:

1. A display unit for displaying a plurality of images including a first image and a second image, the display unit comprising:

a light-emitting display device including a light-emission surface and a plurality of pixels for displaying an image;

an image signal output section for controlling the display device, the image signal output section providing image data to the display device so that at least one first pixel of the plurality of pixels displays the first image and at least one second pixel of pixels adjacent to the at least one first pixel displays the second image;

a parallax barrier arranged facing the light-emission surface of the display device, the parallax barrier including a plurality of slit regions, each slit region being switched between a transmitting state allowing transmitting of light and a shielding state prohibiting transmitting of light;

a lenticular lens arranged facing the plurality of slit regions of the parallax barrier; and a slit control section for alternately switching each slit region between the transmitting state and the shielding state at a predetermined cycle; wherein the image signal output section provides, in synchronization with the switching of the plurality of slit regions between the transmitting state and the shielding state, the image data to the display device so that each of the at least one first pixel and the at least one second pixel displays an image different from the image displayed before switching the slit region between the transmitting state and the shielding state.

2. The display unit according to claim 1, wherein when the first image and the second image are viewed by an observer with both eyes, the first and second images have a parallax between the left and right eyes.

3. The display unit as claimed in claim 1, wherein the display device includes:
a back light device; and
a transmissive image display panel including a plurality of pixels for passing light from the back light device and displaying the images.

4. The display unit as claimed in claim 3, wherein the transmissive image display panel displays color images and each of the pixels displays one of red, green, or blue.

5. The display unit as claimed in claim 3, wherein the transmissive image display panel displays color images, and each pixel includes three partitions partitioned in a vertical direction of the transmissive image display panel, which three partitions display red, green, or blue.

6. The display device as claimed in claim 3, wherein the transmissive image display panel is a liquid crystal panel.

7. The display device as claimed in claim 3, wherein the transmissive image display panel is a PLZT panel.

8. The display unit as claimed in claim 1, wherein the parallax barrier is a liquid crystal panel.

9. The display unit as claimed in claim 1, wherein the parallax barrier is a PLZT panel.

10. The display unit as claimed in claim 1, wherein the display device is a self-emitting display.

11. A display unit having a horizontal direction comprising:
a light-emitting display device including a light-emission surface and a plurality of pixels forming a plurality of display positions arranged in the horizontal direction;
an image signal output section connected to the display device for equally dividing each of N images of a first image to an Nth image having a plurality of continuous parallax to a plurality of divided images and for displaying each of the plurality of divided images of the N images at the plurality of display positions of the display device, the image signal output section providing the display device with image data generated so that each of the divided images of the N images is repeatedly displayed in a predetermined order at the relative display position;
a parallax barrier arranged facing the light-emission surface of the display device, the parallax barrier including a plurality of slit regions arranged in the horizontal direction, each slit region being switched between a transmitting state allowing transmitting of light and a shielding state prohibiting transmitting of light;

a lenticular lens arranged facing the parallax barrier; and a slit control section alternately switching each of the plurality of slit regions between the transmitting state and the shielding state at a predetermined cycle; wherein the image signal output section provides, in synchronization with the switching of the plurality of slit regions between the transmitting state and the shielding state, the image data to the display device so that each pixel displays an image different from the image displayed before switching the slit region between the transmitting state and the shielding state.

12. The display unit as claimed in claim 11, wherein the display device includes:
a back light device; and
a transmissive image display panel including a plurality of pixels for passing light from the back light device and displaying the images.

13. The display unit as claimed in claim 12, wherein the transmissive image display panel displays color images and each of the pixels displays one of red, green, or blue.

14. The display unit as claimed in claim 12, wherein the transmissive image display panel displays color images, and each pixel includes three partitions partitioned in a vertical direction of the transmissive image display panel, which three partitions display red, green, or blue.

15. The display device as claimed in claim 12, wherein the transmissive image display panel is a liquid crystal panel.

16. The display device as claimed in claim 12, wherein the transmissive image display panel is a PLZT panel.

17. The display unit as claimed in claim 11, wherein the parallax barrier is a liquid crystal panel.

18. The display unit as claimed in claim 11, wherein the parallax barrier is a PLZT panel.

19. The display unit as claimed in claim 11, wherein the display device is a self-emitting display.

20. A display unit having a horizontal direction comprising:
a light-emitting display device for displaying an image, the display device including a light-emission surface and a plurality of pixels forming a plurality of display positions arranged in the horizontal direction;
an image signal output section for providing image data to a plurality of pixels of the display device, the image signal output section equally dividing each of a right eye image and a left eye image to a plurality of divided images each displayed on the plurality of display positions of the display device, the image signal output section providing the display device with image data generated so that a mixed image in which the divided images of the right eye image and the divided images of the left eye image are alternately arranged side-by-side in the horizontal direction is displayed on the plurality of display positions;
a parallax barrier arranged facing the light-emission surface of the display device, the parallax barrier including a plurality of slit regions arranged in the horizontal direction, each slit region being switched between a transmitting state allowing transmitting of light and a shielding state prohibiting transmitting of light;
a lenticular lens arranged facing the parallax barrier; and
a slit control section alternately switching each of the plurality of slit regions between the transmitting state and the shielding state at a predetermined cycle so that light of the divided images of the right eye image and light of the divided images of the left eye image alternately transmit through the parallax barrier; wherein the image signal output section provides, in synchronization with the switching of the plurality of slit regions between the transmitting state and the shielding state, the image data to the display device so that the divided images related to the left eye image and the divided images related to the right eye image are alternately displayed on each display positions.

21. The display unit as claimed in claim 20, wherein the image signal output section provides an image signal to the plurality of pixels so that after the switching of the slit region between the transmitting state and the shielding state, pixels on both sides of an arbitrary pixel in the horizontal direction display divided images of an intermediate image with parallax between the left eye image and the right eye image.

22. The display unit as claimed in claim 20, wherein the display device includes:

a back light device; and a transmissive image display panel including a plurality of pixels for passing light from the back light device and displaying the images.

23. The display unit as claimed in claim 22, wherein the transmissive image display panel displays color images and each of the pixels displays one of red, green, or blue.

24. The display unit as claimed in claim 22, wherein the transmissive image display panel displays color images, and each pixel includes three partitions partitioned in a vertical direction of the transmissive image display panel, which three partitions display red, green, or blue.

25. The display device as claimed in claim 22, wherein the transmissive image display panel is a liquid crystal panel.

26. The display device as claimed in claim 22, wherein the transmissive image display panel is a PLZT panel.

27. The display unit as claimed in claim 20, wherein the parallax barrier is a liquid crystal panel.

28. The display unit as claimed in claim 20, wherein the parallax barrier is a PLZT panel.

29. The display unit as claimed in claim 20, wherein the display device is a self-emitting display.

30. A display unit comprising:

a light-emitting display device including a light-emission surface and a plurality of pixels displaying images;

an image signal output section for controlling the display device, the image signal output section providing image data to the display device so that at least one first pixel of the plurality of pixels displays a first image and at least one second pixel of pixels adjacent to the at least one first pixel displays a second image;

a parallax barrier arranged facing the light-emission surface of the display device, the parallax barrier including a plurality of slit regions, each being switched between a transmitting state allowing transmitting of light and a shielding state prohibiting transmitting of light;

a slit control section for switching each of the plurality of slit regions between the transmitting state and the shielding state; and a lenticular lens arranged facing the plurality of slit regions of the parallax barrier.

31. The display unit as claimed in claim 30, wherein when the first image and the second image are viewed by an observer with both eyes, the first and second images have a parallax between the left and right eyes.

32. A display unit comprising:

a back light device;

a transmissive image display panel including a plurality of pixels for passing light from the back light device and displaying an image;

an image signal output section for controlling the transmissive image display panel, the image signal output section providing image data to the transmissive image display panel so that at least one first pixel of the plurality of pixels displays a first image and at least one second pixel of pixels adjacent to the at least one first pixel displays a second image;

a parallax barrier arranged facing the transmissive image display panel, the parallax barrier including a plurality of slit regions, each slit region being switched between a transmitting state allowing transmitting of light and a shielding state prohibiting transmitting of light;

a slit control section for switching each of the plurality of slit regions between the transmitting state and the shielding state; and a lenticular lens, arranged facing the parallax barrier, including same number of lens portions as the plurality of slit regions.

33. The display unit as claimed in claim 32, wherein when the first image and the second image are viewed by an observer with both eyes, the first and second images have a parallax between the left and right eyes.

34. A display unit comprising:

a self-emitting display including a plurality of pixels for displaying an image;

an image signal output section for controlling the self-emitting display, the image signal output section providing image data to the self-emitting display so that at least one first pixel of the plurality of pixels displays a first image and at least one second pixel of pixels adjacent to the at least one first pixel displays a second image;

a parallax barrier arranged facing the self-emitting display, the parallax barrier including a plurality of slit regions, each slit region being switched between a transmitting state allowing transmitting of light and a shielding state prohibiting transmitting of light;

a slit control section for selectively switching each of the plurality of slit regions between the transmitting state and the shielding state; and a lenticular lens, arranged facing the parallax barrier, including same number of lens portions as the plurality of slit regions.

35. The display unit as claimed in claim 34, wherein when the first image and the second image are viewed by an observer with both eyes, the first and second images have a parallax between the left and right eyes.

36. A display unit comprising:

a light-emitting display device for displaying an image, the display device including a light-emission surface and a plurality of pixels forming a plurality of display positions aligned in a horizontal direction;

an image signal output section for providing image data to the plurality of pixels of the display device, the image signal output section equally dividing a right eye image and a left eye image to a plurality of divided images each displayed on the plurality of display positions of the display device, generating image data so as to display a mixed image in which the divided images of the right eye image and the divided images of the left eye image are alternately arranged side-by-side in the horizontal direction, and providing the image data to the display device;

a parallax barrier arranged facing the light-emission surface of the display device, the parallax barrier including a plurality of slit regions arranged in the horizontal direction, each slit region being selectively switched between a transmitting state allowing transmitting of light and a shielding state prohibiting transmitting of light;

a lenticular lens arranged facing the parallax barrier; and a slit control section for alternately switching each of the plurality of slit regions between the transmitting state and the shielding state at a predetermined cycle so that light of the divided images of the right eye image and light of the divided images of the left eye image in the mixed image alternately pass through the parallax barrier; wherein the image signal output section provides, in synchronization with the switching of the slit region between the transmitting state and the shielding state, image data to the display device so that the divided images related to the left eye image and the divided images related to the right eye image are alternately displayed at each display position.

* * * * *

UNITED STATES PATENT AND TRADEMARK OFFICE
CERTIFICATE OF CORRECTION

PATENT NO. : 7,066,599 B2  
APPLICATION NO. : 10/869218  
DATED : June 27, 2006  
INVENTOR(S) : Tomohiko Hattori et al.

Page 1 of 1

It is certified that error appears in the above-identified patent and that said Letters Patent is hereby corrected as shown below:

Column 9, line 27, please delete "data of a divided images" and insert therefore --data of α divided images--;

Signed and Sealed this

Tenth Day of April, 2007

JON W. DUDAS  
*Director of the United States Patent and Trademark Office*